US012175913B2

(12) United States Patent
Kim et al.

(10) Patent No.: US 12,175,913 B2
(45) Date of Patent: Dec. 24, 2024

(54) DISPLAY APPARATUS AND METHOD OF DRIVING DISPLAY PANEL USING THE SAME

(71) Applicant: Samsung Display Co., Ltd., Yongin-Si (KR)

(72) Inventors: Subin Kim, Suwon-si (KR); Seongkyun Kim, Seoul (KR); Se-Byung Chae, Seongnam-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 17/558,998

(22) Filed: Dec. 22, 2021

(65) Prior Publication Data

US 2022/0327985 A1 Oct. 13, 2022

(30) Foreign Application Priority Data

Apr. 13, 2021 (KR) ........................ 10-2021-0047917

(51) Int. Cl.
*G09G 3/20* (2006.01)

(52) U.S. Cl.
CPC ..... *G09G 3/2092* (2013.01); *G09G 2310/027* (2013.01); *G09G 2310/0272* (2013.01); *G09G 2330/021* (2013.01)

(58) Field of Classification Search
CPC ........... G09G 3/2092; G09G 2310/027; G09G 2310/0272; G09G 2330/021; G09G 2320/10; G09G 2370/08; G09G 3/2096; G09G 3/20; G09G 5/001; G09G 3/2007; G09G 2320/0271; G09G 2320/0295
See application file for complete search history.

(56) References Cited

U.S. PATENT DOCUMENTS

| | | | | |
|---|---|---|---|---|
| 4,881,067 | A * | 11/1989 | Watanabe | G09G 5/02 345/441 |
| 10,102,816 | B2 * | 10/2018 | Hou | G02F 1/133 |
| 10,176,739 | B2 * | 1/2019 | Singh | G09G 3/20 |
| 10,204,538 | B2 | 2/2019 | Kim et al. | |
| 11,138,950 | B1 * | 10/2021 | Kuo | G09G 5/003 |
| 2002/0140685 | A1 * | 10/2002 | Yamamoto | G09G 3/20 345/204 |
| 2003/0122736 | A1 * | 7/2003 | Kang | G09G 3/2944 345/60 |
| 2007/0152934 | A1 * | 7/2007 | Maeda | G09G 3/3233 345/92 |

(Continued)

FOREIGN PATENT DOCUMENTS

| | | | |
|---|---|---|---|
| KR | 10-0752160 | B1 | 8/2007 |
| KR | 10-2008-0086060 | A | 9/2008 |

(Continued)

*Primary Examiner* — Jose R Soto Lopez
(74) *Attorney, Agent, or Firm* — Innovation Counsel LLP

(57) ABSTRACT

A display apparatus includes a display panel, a data analyzer, a logic core and a latch. The display panel is configured to display an image. The data analyzer is configured to analyze input image data. The logic core is configured to compensate all of line data, compensate a part of the line data, or not compensate all of the line data according to an analysis result of the data analyzer. The latch is configured to receive compensated data from the logic core.

16 Claims, 8 Drawing Sheets

(56) References Cited

U.S. PATENT DOCUMENTS

2007/0229426 A1* 10/2007 You .................. G09G 3/3648 345/89
2008/0024398 A1* 1/2008 Hwang .................. G09G 3/006 345/60
2008/0122769 A1* 5/2008 Takaki .................. G09G 3/3648 345/87
2009/0058775 A1* 3/2009 Hotta .................. G09G 3/3648 345/87
2009/0174634 A1* 7/2009 Kohno .................. G09G 3/3233 345/84
2010/0079473 A1* 4/2010 Choi .................. G09G 3/3648 345/545
2010/0214316 A1* 8/2010 Kim .................. G09G 3/3614 345/204
2011/0157256 A1* 6/2011 Sakamoto .................. G09G 3/344 345/214
2011/0181569 A1* 7/2011 Liu .................. G09G 3/344 345/204
2012/0035897 A1* 2/2012 Bell .................. G09B 29/12 703/2
2012/0206467 A1* 8/2012 Shih .................. G09G 3/344 345/545
2013/0113771 A1* 5/2013 Todorovich .................. G09G 3/3466 345/211
2013/0135272 A1* 5/2013 Park .................. G09G 3/3233 345/211
2014/0085276 A1* 3/2014 Jang .................. G09G 3/2007 345/204
2014/0240330 A1* 8/2014 Mahe .................. G09G 5/391 345/520
2015/0145842 A1* 5/2015 Maeda .................. G09G 3/2092 345/94
2015/0154734 A1* 6/2015 Kim .................. G09G 5/006 345/519
2015/0161946 A1* 6/2015 Agostinelli .................. G02F 1/136213 345/211
2016/0049123 A1* 2/2016 Jeong .................. G09G 3/3607 345/88
2016/0063921 A1* 3/2016 Tsai .................. G09G 3/3233 345/76
2016/0098967 A1* 4/2016 Kwon .................. G09G 3/3614 345/100
2016/0104408 A1* 4/2016 Kim .................. G09G 3/36 345/690
2016/0133176 A1* 5/2016 Oh .................. G09G 3/3648 345/694
2016/0267868 A1* 9/2016 Choi .................. G09G 3/3266
2016/0267876 A1* 9/2016 Kim .................. G09G 5/10
2017/0004783 A1* 1/2017 Ishihara .................. G09G 3/346
2017/0061869 A1* 3/2017 Bae .................. G09G 3/3275
2017/0061928 A1* 3/2017 Kim .................. G09G 3/3685
2017/0132990 A1* 5/2017 He .................. G09G 3/3426
2017/0186395 A1* 6/2017 Jeon .................. G09G 3/3677
2017/0199714 A1* 7/2017 Kim .................. G09G 3/006
2017/0213493 A1* 7/2017 Han .................. G09G 3/3208
2017/0287429 A1* 10/2017 Kong .................. G09G 3/3607
2018/0025689 A1* 1/2018 Aamold .................. G09G 3/2007 345/212
2018/0035126 A1* 2/2018 Lee .................. H04N 19/503
2018/0174516 A1* 6/2018 Kim .................. H10K 59/131
2018/0240433 A1* 8/2018 Liu .................. G09G 3/3614
2018/0366055 A1* 12/2018 Yoon .................. G09G 3/2096
2019/0122636 A1* 4/2019 Tang .................. G09G 5/10
2019/0197979 A1* 6/2019 Kim .................. G09G 3/3685
2019/0287207 A1* 9/2019 Wang .................. G06T 1/20
2019/0378471 A1* 12/2019 Lee .................. G09G 3/3696
2020/0035173 A1* 1/2020 Kim .................. G09G 3/3688
2020/0051515 A1* 2/2020 Kim .................. G09G 3/3614
2020/0058251 A1* 2/2020 Lee .................. G09G 3/3225
2020/0111455 A1* 4/2020 Lee .................. G09G 3/2007
2020/0154120 A1* 5/2020 Venkitasubramani .................. H04N 19/174
2020/0265773 A1* 8/2020 Fujii .................. G09G 3/20
2020/0335027 A1* 10/2020 Kim .................. G09G 3/20
2021/0049963 A1* 2/2021 Amirkhany .................. G09G 3/3258
2021/0157608 A1* 5/2021 Yu .................. G06F 9/4411
2021/0183331 A1* 6/2021 Liu .................. G06F 3/1431
2021/0217367 A1* 7/2021 Amirkhany .................. G09G 3/3233
2021/0225277 A1* 7/2021 Xu .................. G09G 3/3233
2021/0225299 A1* 7/2021 Xi .................. G09G 3/3426
2021/0264832 A1* 8/2021 Seo .................. G09G 3/2007
2022/0036833 A1* 2/2022 Park .................. G09G 3/2003
2022/0150456 A1* 5/2022 Steudel .................. H04N 9/3185
2022/0157270 A1* 5/2022 Wu .................. G09G 3/3648
2022/0165227 A1* 5/2022 Xiao .................. G09G 3/3648
2022/0180825 A1* 6/2022 Hsiao .................. G06F 16/285
2022/0189435 A1* 6/2022 Akiyama .................. G06T 1/20
2022/0230599 A1* 7/2022 Han .................. G09G 3/2074
2022/0337755 A1* 10/2022 Huang .................. H04N 23/611
2023/0048619 A1* 2/2023 Kim .................. G09G 3/32
2023/0071402 A1* 3/2023 Xiao .................. G09G 3/2096
2023/0298506 A1* 9/2023 Matsuyama .................. G09G 3/2081 345/204

FOREIGN PATENT DOCUMENTS

KR 10-0892351 B1 4/2009
KR 10-1536102 B1 7/2015
KR 10-2017-0024229 A 3/2017

* cited by examiner

DISPLAY APPARATUS AND METHOD OF DRIVING DISPLAY PANEL USING THE SAME

PRIORITY STATEMENT

This application claims priority under 35 U.S.C. § 119 to Korean Patent Application No. 10-2021-0047917, filed on Apr. 13, 2021, in the Korean Intellectual Property Office KIPO, the contents of which are herein incorporated by reference in their entireties.

BACKGROUND

1. Field

Embodiments of the present inventive concept relate to a display apparatus and a method of driving a display panel using the display apparatus. More particularly, embodiments of the present inventive concept relate to a display apparatus analyzing input image data and omitting data processing of a portion of the input image data or all of the input image data, and a method of driving a display panel using the display apparatus.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls the gate driver and the data driver.

The driving controller includes logics compensating the input image data to enhance a display quality. As operations of the logics are advanced, a gate count may increase and a number of toggling of data may increase so that a power consumption due to the data operation logic may increase.

SUMMARY

Embodiments of the present inventive concept provide a display apparatus analyzing input image data and omitting data processing of a portion of the input image data or all of the input image data to reduce a power consumption.

Embodiments of the present inventive concept also provide a method of driving a display panel using the display apparatus.

In an embodiment of a display apparatus according to the present inventive concept, the display apparatus includes a display panel, a data analyzer, a logic core and a latch. The display panel is configured to display an image. The data analyzer is configured to analyze input image data. The logic core is configured to compensate all of line data, compensate a part of the line data, or not compensate all of the line data according to an analysis result of the data analyzer. The latch is configured to receive compensated data from the logic core.

In an embodiment, the data analyzer may be configured to determine whether the line data represent a single pattern. The single pattern may mean that all pixel data included in the line data have a same grayscale value.

In an embodiment, the display apparatus may further include a data transmitter configured to output first pixel data among the line data to the logic core when the line data represent the single pattern.

In an embodiment, the display apparatus may further include a flag generator configured to generate a flag signal having a flag of one when the line data represent the single pattern and configured to generate the flag signal having a flag of zero when the line data do not represent the single pattern.

In an embodiment, when the flag is one, the logic core may be configured to compensate only the first pixel data and to output compensated first pixel data to the latch. When the flag is zero, the logic core may be configured to compensate all of the line data and to output compensated line data to the latch.

In an embodiment, when the flag is one, the logic core may be configured to compensate the first pixel data and to output compensated first pixel data to a second logic core. When the flag is zero, the logic core may be configured to compensate all of the line data and to output compensated line data to the second logic core. The second logic core may be configured to compensate input data regardless of the flag.

In an embodiment, the data analyzer may be configured to determine whether grayscale values of all subpixels of the line data are equal to or less than a threshold grayscale value.

In an embodiment, the display apparatus may further include a data transmitter configured to output first pixel data among the line data to the logic core when the grayscale values of all subpixels of the line data are equal to or less than the threshold grayscale value.

In an embodiment, when the grayscale values of all subpixels of the line data are equal to or less than the threshold grayscale value, the latch may be configured to output predetermined fixed data.

In an embodiment, the data analyzer may be configured to determine whether the line data are substantially the same as previous line data stored in a line buffer.

In an embodiment, the display apparatus may further include a flag generator configured to generate a flag signal having a flag of one when the line data are substantially the same as the previous line data and configured to generate the flag signal having a flag of zero when the line data are different from the previous line data.

In an embodiment, when the flag is one, the logic core may be configured not to operate. When the flag is zero, the logic core may be configured to compensate all of the line data and to output compensated line data to the latch.

In an embodiment, when the flag is one, the logic core may be configured not to operate. When the flag is zero, the logic core may be configured to compensate all of the line data and to output compensated line data to a second logic core. The second logic core may be configured to compensate input data regardless of the flag and to output compensated input data to the latch.

In an embodiment, when the flag is one, the second logic core may be configured to directly receive the line data from a selector.

In an embodiment, the display apparatus may further include a flag generator configured to generate a flag signal representing a state of the line data according to an analysis result of the data analyzer, a line buffer configured to store the line data and a selector configured to selectively output the line data stored in the line buffer to the logic core based on the flag signal.

In an embodiment, the display apparatus may further include a data transmitter configured to output first pixel data among the line data to the logic core according to the analysis result of the data analyzer.

In an embodiment of a method of driving a display panel according to the present inventive concept, the method includes analyzing input image data, compensating the line data using a logic core and outputting a data voltage to the display panel based on compensated data received from the logic core. The compensating the line data may include compensating all of the line data, compensating a part of the line data, or not compensating all of the line data according to an analysis result of the input image data.

In an embodiment, the method may further include determining whether the line data represent a single pattern in which all pixel data included in the line data have a same grayscale value, compensating only first pixel data among the line data when the line data represent the single pattern, outputting compensated first pixel data to all of the pixels in a line of the display panel when the line data represent the single pattern, compensating respective pixel data of the line data when the line data do not represent the single pattern and outputting respective compensated pixel data to respective pixels in the line of the display panel when the line data do not represent the single pattern.

In an embodiment, the method may further include determining whether grayscale values of all subpixels of the line data are equal to or less than a threshold grayscale value, compensating only first pixel data among the line data when the grayscale values of all subpixels of the line data are equal to or less than the threshold grayscale value, outputting compensated first pixel data to all of the pixels in a line of the display panel when the grayscale values of all subpixels of the line data are equal to or less than the threshold grayscale value, compensating respective pixel data of the line data when a grayscale value of at least one subpixel of the line data is greater than the threshold grayscale value and outputting respective compensated pixel data to respective pixels in the line of the display panel when the grayscale value of at least one subpixel of the line data is greater than the threshold grayscale value.

In an embodiment, the method may further include determining whether the line data are substantially the same as previous line data stored in a line buffer, outputting previous line data stored in a latch to pixels in a line of the display panel when the line data are substantially the same as the previous line data stored in the line buffer, compensating respective pixel data of the line data when the line data are different from the previous line data stored in the line buffer and outputting respective compensated pixel data to respective pixels in the line of the display panel when the line data are different from the previous line data stored in the line buffer.

According to the display apparatus and the method of driving the display panel, the input image data may be analyzed and the data processing of a portion of the input image data or all of the input image data may be omitted so that the power consumption may be reduced.

For example, when the line data of the input image data represent a single pattern, the grayscale values of all of the subpixels in the line data are equal to or less than the threshold grayscale value or the line data are same as the previous line data, some or all of the data processing of the logic core may be omitted so that the power consumption due to the data operation logics may be reduced.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
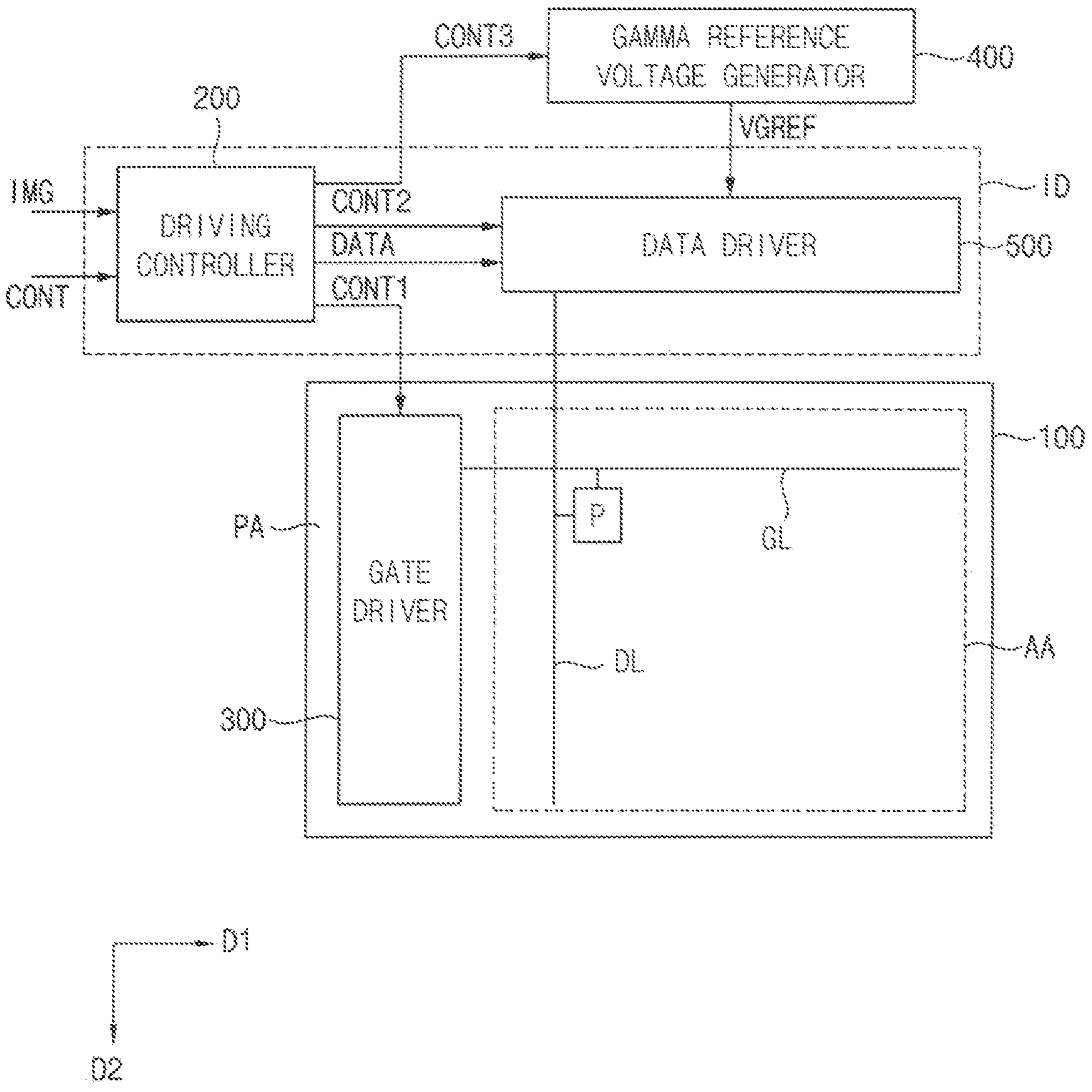
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400 and a data driver 500.

The driving controller 200 and the data driver 500 may be integrated into one chip. Alternatively, the driving controller 200, the gamma reference voltage generator 400 and the data driver 500 may be integrated into one chip. A driving module including at least the driving controller 200 and the data driver 500 which are integrated into one chip may be called to an integrated driver ID.

The display panel 100 has a display region AA on which an image is displayed and a peripheral region PA disposed adjacent to the display region AA.

The display panel 100 includes a plurality of gate lines GL, a plurality of data lines DL and a plurality of subpixels P connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT and outputs the third control signal CONT3 to the gamma reference voltage generator 400.

A structure and an operation of the driving controller 200 are explained referring to FIGS. 2 to 4 and 7 in detail.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. The gate driver 300 may be mounted on the peripheral region PA of the display panel 100. For example, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be embedded in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
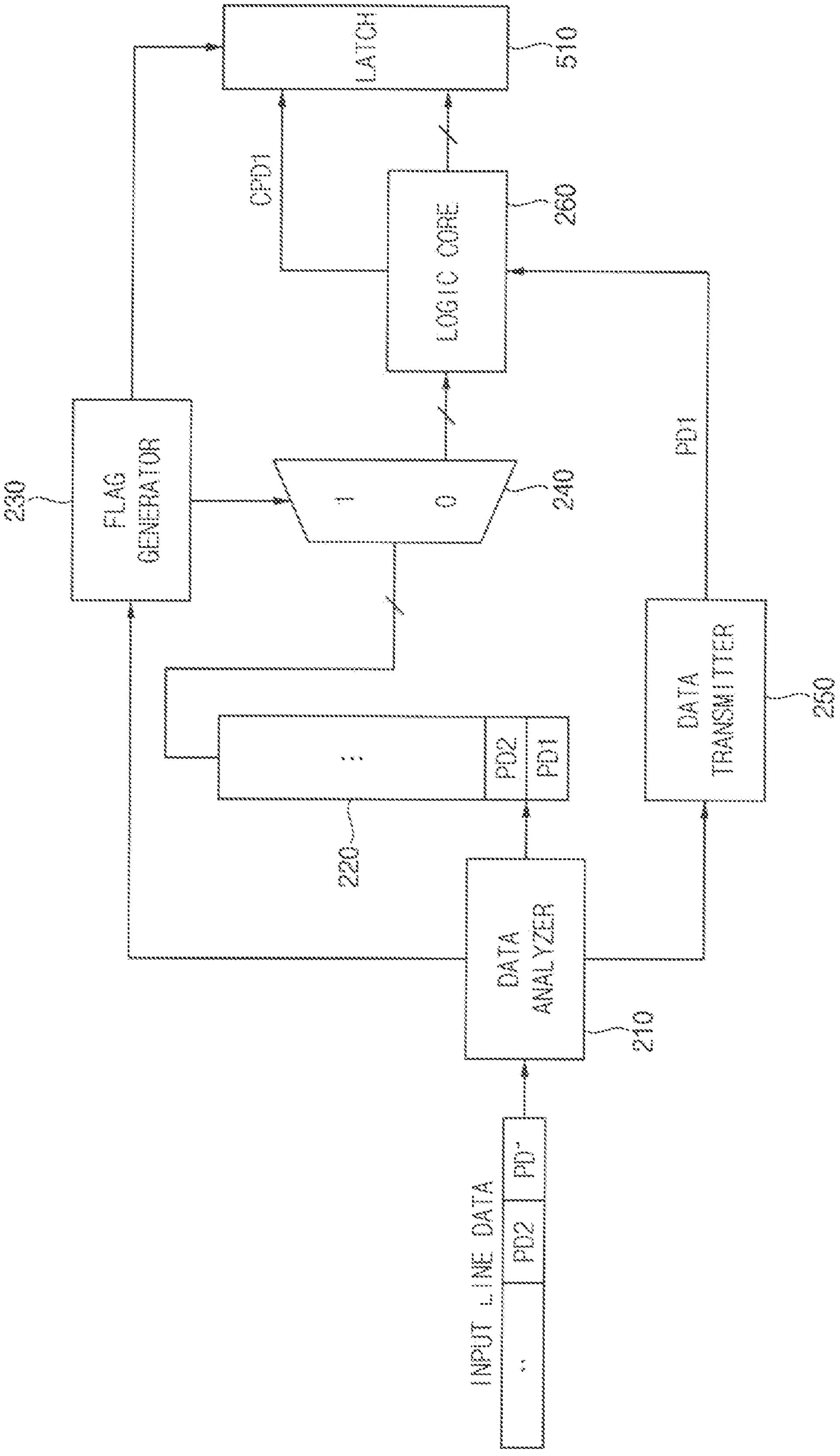
FIG. 2 is a block diagram illustrating an integrated driver of FIG. 1.
Figure 3:
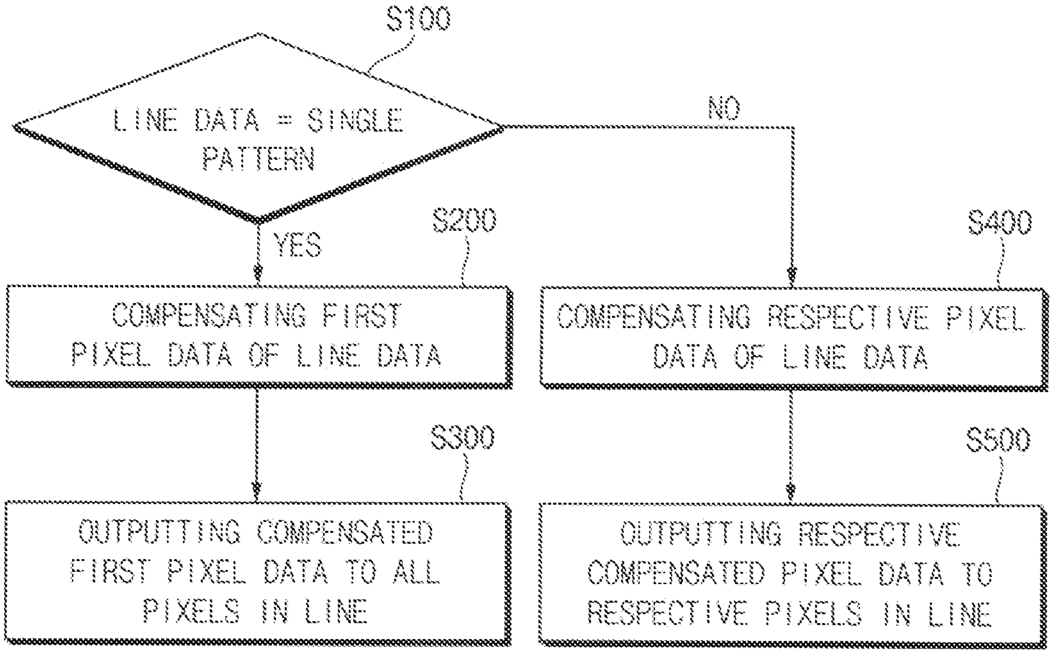
FIG. 3 is a flowchart diagram illustrating an example of an operation of the integrated driver of FIG. 1.

FIG. 2 is a block diagram illustrating the integrated driver ID of FIG. 1. FIG. 3 is a flowchart diagram illustrating an example of an operation of the integrated driver ID of FIG. 1.

Referring to FIGS. 1 to 3, the integrated driver ID may include a data analyzer 210, a logic core 260 and a latch 510. The data analyzer 210 may analyze the input image data IMG which include the input line date. The logic core 260 may compensate all of line data, compensate a part of the line data, or not compensate the line data according to the analysis result of the data analyzer 210. The latch 510 may receive compensated data from the logic core 260.

For example, the input image data IMG inputted to the data analyzer 210 may be input line data.

The integrated driver ID may further include a flag generator 230, a line buffer 220 and a selector 240. The flag generator 230 may generate a flag signal representing a state of the line data according to the analysis result of the data analyzer 210. The line buffer 220 may store the line data. The selector 240 may selectively output the line data stored in the line buffer 220 to the logic core 260 based on the flag signal.

The integrated driver ID may further include a data transmitter 250 outputting first pixel data PD1 among the line data to the logic core 260 according to the analysis result of the data analyzer 210.

In the present embodiment, the data analyzer 210 may determine whether the line data represent a single pattern. The single pattern means that all pixel data included in the line data have the same grayscale value. When first to N-th pixels are disposed in a horizontal line of the display panel 100, the input line data may include first pixel data PD1, second pixel data PD2, . . . , and N-th pixel data corresponding to first to N-th pixels.

For example, when the first pixel includes a first subpixel, a second subpixel and a third subpixel, the first pixel data PD1 may include first subpixel data, second subpixel data and third subpixel data. For example, the first subpixel, the second subpixel and the third subpixel may be a red subpixel, a green subpixel and a blue subpixel.

When the first subpixel data, the second subpixel data and the third subpixel data of the first pixel data PD1 respectively represent a grayscale value of 50, a grayscale value of 80 and a grayscale value of 150, and the first subpixel data, the second subpixel data and the third subpixel data of each of the second to N-th pixel data respectively represent a grayscale value of 50, a grayscale value of 80 and a grayscale value of 150, the line data may represent the single pattern.

Although the pixel includes the first subpixel, the second subpixel and the third subpixel in the present embodiment, the present inventive concept may not be limited thereto. Alternatively, the pixel may include two subpixels. Alternatively, the pixel may include four or more subpixels. For example, the pixel may include a red subpixel, a green subpixel, a blue subpixel and a white subpixel.

When the line data represent the single pattern, the data transmitter 250 may output the first pixel data PD1 among the line data to the logic core 260. When the line data represent the single pattern, all of the pixel data in the line data have the same grayscale values so that the data transmitter 250 may output only the first pixel data PD1 which is one of the line data. In this case, the logic core 260 compensates only the first pixel data PD1 so that a power consumption may be significantly reduced compared to a case in which all pixel data of the line data are compensated.

Although the data transmitter 250 outputs the first pixel data PD1 to the logic core 260 in the present embodiment when the line data represent the single pattern, the present inventive concept may not be limited thereto. When the line data represent the single pattern, all pixel data included in the line data have the same grayscale value so that the data transmitter 250 may output any one of the first to N-th pixel data to the logic core 260.

For example, when the line data represent the single pattern, the flag generator 230 may generate the flag signal having a flag of one. When the line data do not represent the single pattern, the flag generator 230 may generate the flag signal having a flag of zero. The flag generator 230 may output the flag signal to the selector 240 and the latch 510.

When the flag is one, the selector 240 may not output the line data to the logic core 260. In contrast, when the flag is zero, the selector 240 may output the line data to the logic core 260.

When the flag is one, the logic core 260 may compensate the first pixel data PD1 received from the data transmitter 250 and may output compensated first pixel data CPD1 to the latch 510. When the flag is zero, the logic core 260 may compensate all of the line data and may output the compensated line data to the latch 510.

As shown in FIG. 3, the data analyzer 210 determines whether the line data represent the single pattern (step S100). When the line data represent the single pattern, the logic core 260 may compensate only the first pixel data PD1 of the line data (step S200). When the line data represent the single pattern, the compensated first pixel data CPD1 may be outputted to all of the pixels in the line of the display panel 100 (step S300).

When the line data do not represent the single pattern, the logic core 260 may compensate respective pixel data of the line data (step S400). When the line data do not represent the single pattern, the respective compensated pixel data may be outputted to respective pixels in the line of the display panel (step S500).

The data analyzer 210, the line buffer 220, the flag generator 230, the selector 240, the data transmitter 250, the logic core 260 and the latch 510 may be included in the integrated driver ID.

Alternatively, the data analyzer 210, the line buffer 220, the flag generator 230, the selector 240, the data transmitter 250 and the logic core 260 may be included in the driving controller 200 and the latch 510 may be included in the data driver 500. However, the present inventive concept may not be limited to the positions of the data analyzer 210, the line buffer 220, the flag generator 230, the selector 240, the data transmitter 250, the logic core 260 and the latch 510.

Figure 4:
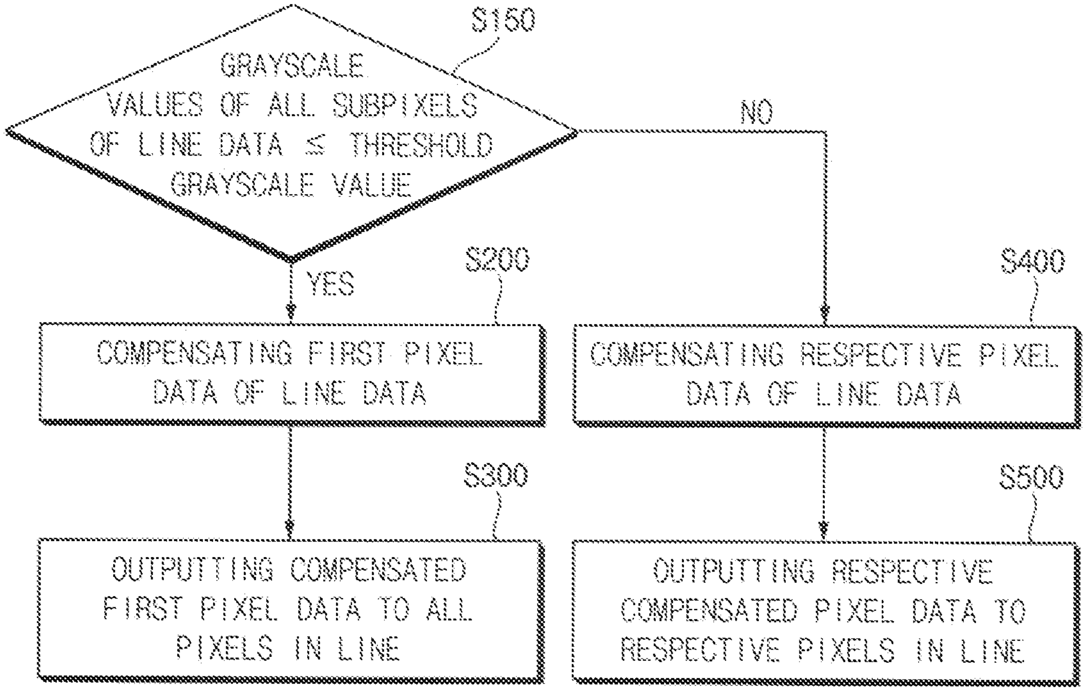
FIG. 4 is a flowchart diagram illustrating an example of an operation of the integrated driver of FIG. 1.

FIG. 4 is a flowchart diagram illustrating an example of an operation of the integrated driver ID of FIG. 1.

Referring to FIGS. 1, 2 and 4, the data analyzer 210 may determine whether grayscale values of all subpixels of the line data are equal to or less than a threshold grayscale value in the present embodiment.

When the grayscale values of all subpixels of the line data are equal to or less than the threshold grayscale value, the data transmitter 250 may output first pixel data PD1 among the line data to the logic core 260.

For example, when the grayscale values of all subpixels of the line data are equal to or less than the threshold grayscale value, data of each pixel may not be well distinguished from each other by a user. Thus, the data transmitter 250 may output the first pixel data PD1 among the line data to the logic core 260.

In this case, the logic core 260 compensates only the first pixel data PD1 so that a power consumption may be significantly reduced compared to a case in which all pixel data of the line data are compensated.

Alternatively, when the grayscale values of all subpixels of the line data are equal to or less than the threshold grayscale value, the latch 510 may output predetermined fixed data. When the grayscale values of all subpixels of the line data are equal to or less than the threshold grayscale value, an image corresponding to the line data may be perceived as a black image to the user so that the compensation operation of the logic core 260 may not be meaningful. When the grayscale values of all subpixels of the line data are equal to or less than the threshold grayscale value, the compensation operation of the logic core 260 may not be meaningful even if the image corresponding to the line data may not be perceived as the black image to the user. Thus, when the grayscale values of all subpixels of the line data are equal to or less than the threshold grayscale value, the compensation operation of the logic core 260 may be omitted.

The predetermined fixed data may be stored in the logic core 260 or stored in the data analyzer 210, the line buffer 220, the data transmitter 250 or the flag generator 230.

For example, when the grayscale values of all subpixels of the line data are equal to or less than the threshold grayscale value, the flag generator 230 may generate the flag signal having a flag of one. When a grayscale value of at least one subpixel of the line data is greater than the threshold grayscale value, the flag generator 230 may generate the flag signal having a flag of zero. The flag generator 230 may output the flag signal to the selector 240 and the latch 510.

When the flag is one, the selector 240 may not output the line data to the logic core 260. In contrast, when the flag is zero, the selector 240 may output the line data to the logic core 260.

When the flag is one, the logic core 260 may compensate the first pixel data PD1 and may output compensated first pixel data CPD1 to the latch 510. When the flag is zero, the logic core 260 may compensate all of the line data and may output the compensated line data to the latch 510.

As shown in FIG. 4, the data analyzer 210 determines whether the grayscale values of all subpixels of the line data are equal to or less than the threshold grayscale value (step S150). When the grayscale values of all subpixels of the line data are equal to or less than the threshold grayscale value, the logic core 260 may compensate only the first pixel data PD1 of the line data (step S200). When the grayscale values of all subpixels of the line data are equal to or less than the threshold grayscale value, the compensated first pixel data CPD1 may be outputted to all of the pixels in the line of the display panel 100 (step S300).

When the grayscale value of at least one subpixel of the line data is greater than the threshold grayscale value, the logic core 260 may compensate respective pixel data of the line data (step S400). When the grayscale value of at least one subpixel of the line data is greater than the threshold grayscale value, the respective compensated pixel data may be outputted to respective pixels in the line of the display panel (step S500).

Figure 5:
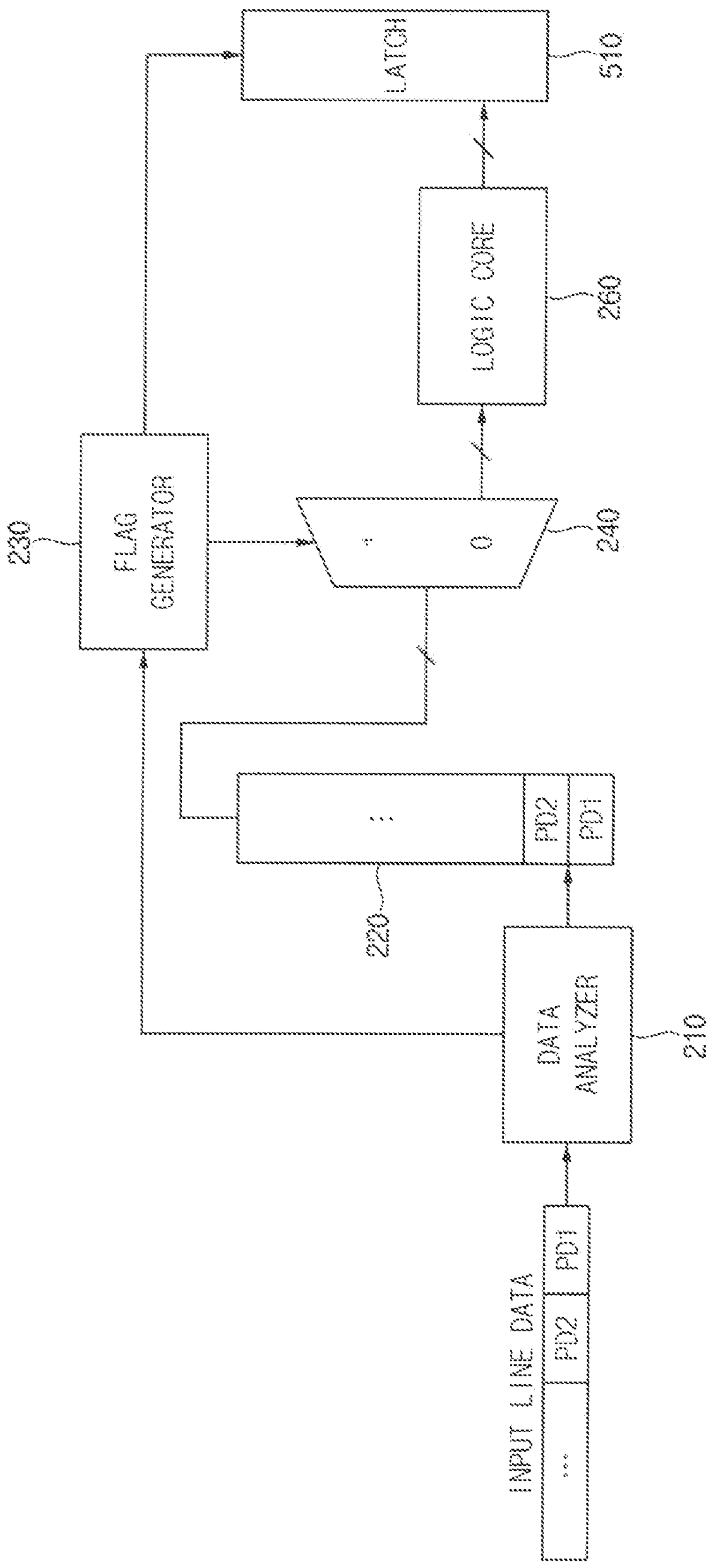
FIG. 5 is a block diagram illustrating an integrated driver of a display apparatus according to an embodiment of the present inventive concept.
Figure 6:
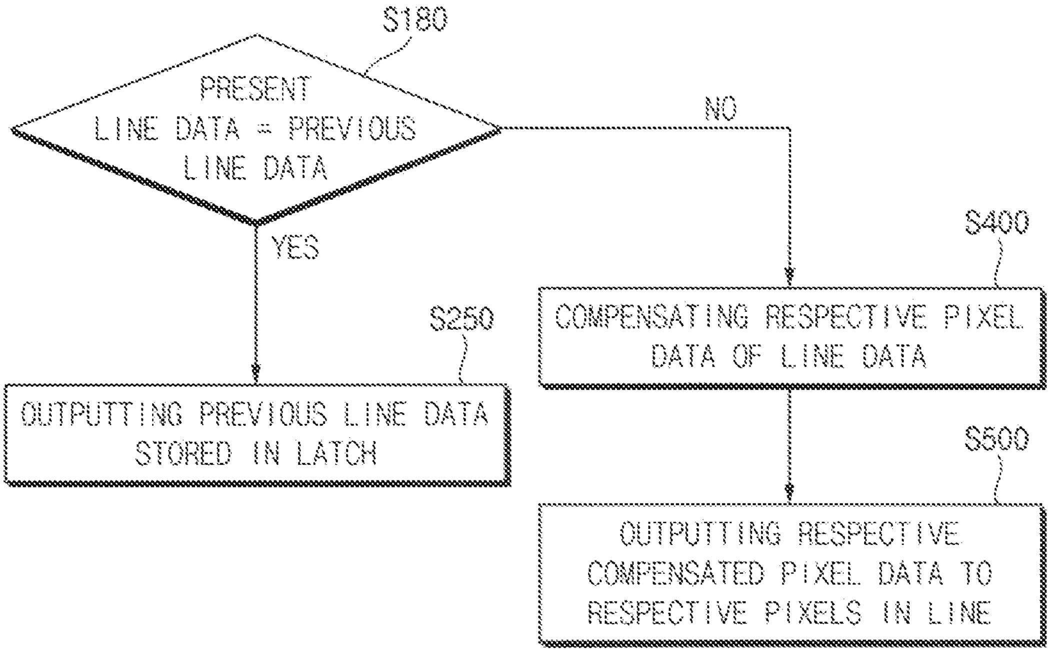
FIG. 6 is a flowchart diagram illustrating an example of an operation of the integrated driver of FIG. 5.

FIG. 5 is a block diagram illustrating an integrated driver ID of a display apparatus according to an embodiment of the present inventive concept. FIG. 6 is a flowchart diagram illustrating an example of an operation of the integrated driver ID of FIG. 5.

The display apparatus and the method of driving the display panel according to the present embodiment is substantially the same as the display apparatus and the method of driving the display panel of the previous embodiment explained referring to FIGS. 1 to 4 except for the structure and the operation of the integrated driver. Thus, the same reference numerals will be used to refer to the same or like parts as those described in the previous embodiment of FIGS. 1 to 4 and any repetitive explanation concerning the above elements will be omitted.

Referring to FIGS. 1, 5 and 6, the display apparatus includes a display panel 100 and a display panel driver. The display panel driver includes a driving controller 200, a gate driver 300, a gamma reference voltage generator 400 and a data driver 500.

The driving controller 200 and the data driver 500 may be integrated into one chip. Alternatively, the driving controller 200, the gamma reference voltage generator 400 and the data driver 500 may be integrated into one chip. A driving module including at least the driving controller 200 and the data driver 500 which are integrated into one chip may be called to the integrated driver ID.

The integrated driver ID may include a data analyzer 210, a logic core 260 and a latch 510. The data analyzer 210 may analyze the input image data IMG which include the input line date. The logic core 260 may compensate all data of line data or omit compensation of a portion of the line data or all of the line data according to the analysis result of the data analyzer 210. The latch 510 may receive compensation data from the logic core 260.

For example, the input image data IMG inputted to the data analyzer 210 may be input line data.

The integrated driver ID may further include a flag generator 230, a line buffer 220 and a selector 240. The flag generator 230 may generate a flag signal representing a state of the line data according to the analysis result of the data analyzer 210. The line buffer 220 may store the line data. The selector 240 may selectively output the line data stored in the line buffer to the logic core 260 based on the flag signal.

In the present embodiment, the data analyzer 210 may determine whether the line data are substantially the same as previous line data stored in the line buffer 220.

When the line data are substantially the same as the previous line data, the line data may not be compensated and may not be refreshed to the latch 510, but the previous line data stored in the latch 510 may be re-outputted to the display panel 100.

For example, when the line data are substantially the same as the previous line data, the flag generator 230 may generate the flag signal having a flag of one. When the line data are different from the previous line data, the flag generator 230 may generate the flag signal having a flag of zero. The flag generator 230 may output the flag signal to the selector 240 and the latch 510.

When the flag is one, the selector 240 may not output the line data to the logic core 260. In contrast, when the flag is zero, the selector 240 may output the line data to the logic core 260.

When the flag is one, the logic core 260 may not operate. When the flag is zero, the logic core 260 may compensate all of the line data and may output the compensated line data to the latch 510.

As shown in FIG. 6, the data analyzer 210 determines whether the line data are substantially the same as the previous line data stored in the line buffer 220 (step S180). When the line data are substantially the same as the previous line data, the logic core 260 may not operate and the previous line data stored in the latch 510 may be outputted to the pixels in the line of the display panel 100 (step S250).

When the line data are different from the previous line data, the logic core 260 may compensate respective pixel data of the line data (step S400). When the line data are different from the previous line data, the respective compensated pixel data may be outputted to respective pixels in the line of the display panel (step S500).

Figure 7:
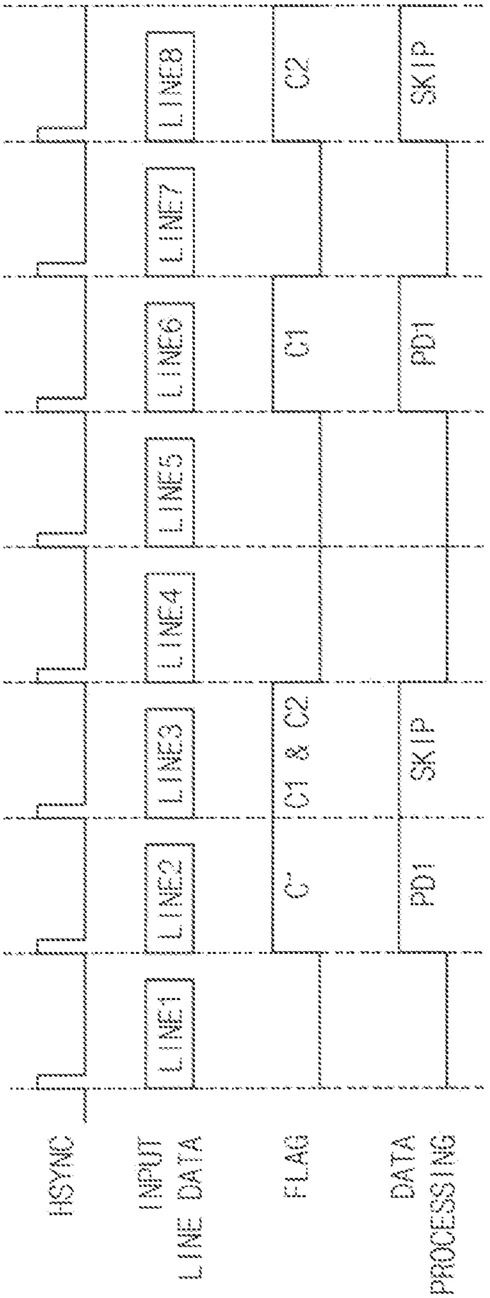
FIG. 7 is a timing diagram illustrating an example of an operation of the integrated driver of FIG. 1.

FIG. 7 is a timing diagram illustrating an example of an operation of the integrated driver ID of FIG. 1.

Referring to FIGS. 1 to 7, the integrated driver ID may operate all of the operation explained referring to FIG. 3, the operation explained referring to FIG. 4 and the operation explained referring to FIG. 7. Herein, the flag signal may be greater than one bit.

For example, the integrated driver ID may determine whether the line data represent the single pattern (case C1) and whether the line data are substantially the same as the previous line data (case C2) in FIG. 7. A horizontal period corresponding to the respective input line data may be defined by a horizontal synchronizing signal HSYNC.

For example, first line data LINE1 may not represent the single pattern. In this case, the logic core 260 may normally operate so that all pixel data of the line data may be compensated.

For example, second line data LINE2 may represent the single pattern and the second line data LINE2 may be different from the first line data LINE1. The second line data LINE2 represent the single pattern so that a flag of C1 may be generated and the logic core 260 may process only first pixel data PD1 of the second line data LINE2 in response to the flag of C1.

For example, third line data LINE3 may represent the single pattern and the third line data LINE3 may be substantially the same as the second line data LINE2. The third line data LINE3 represent the single pattern so that a flag of C1 may be generated and the third line data LINE3 are substantially the same as the second line data LINE2 so that a flag of C2 may be also generated. The logic core 260 may not operate the compensation operation in response to the flag of C2.

For example, fourth line data LINE4 may not represent the single pattern and the fourth line data LINE4 may be different from the third line data LINE3. In this case, the logic core 260 may normally operate so that all pixel data of the line data may be compensated.

For example, fifth line data LINE5 may not represent the single pattern and the fifth line data LINE5 may be different from the fourth line data LINE4. In this case, the logic core 260 may normally operate so that all pixel data of the line data may be compensated.

For example, sixth line data LINE6 may represent the single pattern and the sixth line data LINE6 may be different from the fifth line data LINE5. The sixth line data LINE6 represent the single pattern so that a flag of C1 may be generated and the logic core 260 may process only first pixel data PD1 of the sixth line data LINE6 in response to the flag of C1.

For example, seventh line data LINE7 may not represent the single pattern and the seventh line data LINE7 may be different from the sixth line data LINE6. In this case, the logic core 260 may normally operate so that all pixel data of the line data may be compensated.

For example, eighth line data LINE8 may not represent the single pattern and the eighth line data LINE8 may be substantially the same as the seventh line data LINE7. The eighth line data LINE8 are substantially the same as the seventh line data LINE7 so that a flag of C2 may be generated. The logic core 260 may not operate the compensation operation in response to the flag of C2.

According to the present embodiment, the input image data IMG may be analyzed and the data processing of a portion of the input image data IMG or all of the input image data may be omitted so that the power consumption may be reduced.

For example, when the line data of the input image data IMG represent the single pattern, the grayscale values of all of the subpixels in the line data are equal to or less than the threshold grayscale value or the line data are same as the previous line data, some or all of the data processing of the logic core 260 may be omitted so that the power consumption due to the data operation logics may be reduced.

Figure 8:
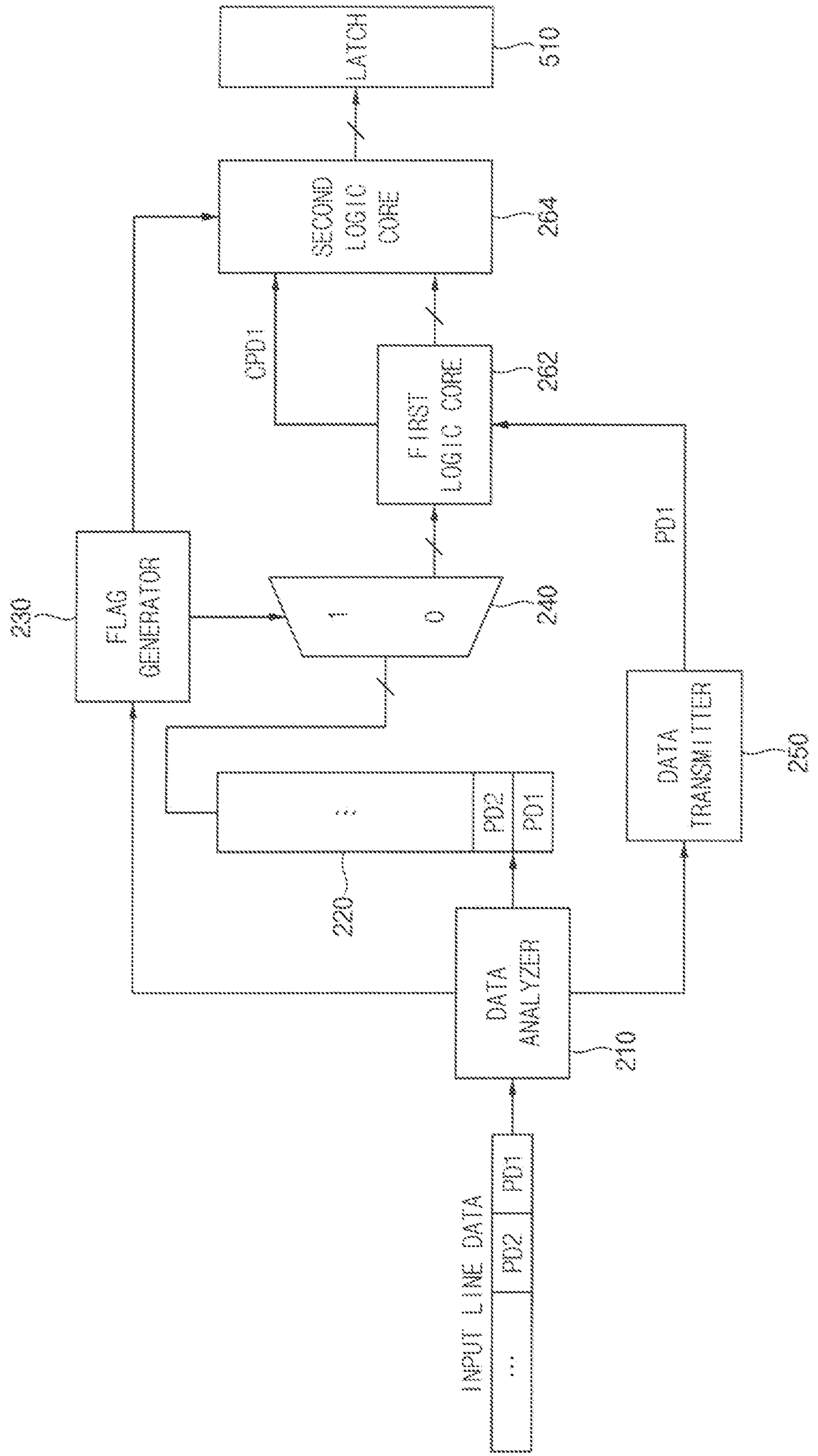
FIG. 8 is a block diagram illustrating an integrated driver of a display apparatus according to an embodiment of the present inventive concept.

FIG. 8 is a block diagram illustrating an integrated driver ID of a display apparatus according to an embodiment of the present inventive concept.

The display apparatus and the method of driving the display panel according to the present embodiment is substantially the same as the display apparatus and the method of driving the display panel of the previous embodiment explained referring to FIGS. 1 to 4 except for the structure and the operation of the integrated driver. Thus, the same reference numerals will be used to refer to the same or like parts as those described in the previous embodiment of FIGS. 1 to 4 and any repetitive explanation concerning the above elements will be omitted.

Referring to FIGS. 1, 3, 4 and 8, the display apparatus includes a display panel 100 and a display panel driver. The display panel driver includes a driving controller 200, a gate driver 300, a gamma reference voltage generator 400 and a data driver 500.

The driving controller 200 and the data driver 500 may be integrated into one chip. Alternatively, the driving controller 200, the gamma reference voltage generator 400 and the data driver 500 may be integrated into one chip. A driving module including at least the driving controller 200 and the data driver 500 which are integrated into one chip may be called to the integrated driver ID.

The integrated driver ID may include a data analyzer 210, a first logic core 262, a second logic core 264 and a latch 510. The data analyzer 210 may analyze the input image data IMG which include the input line date. The first logic core 262 may compensate all of line data, compensate a part of the line data, or not compensate all of the line data according to the analysis result of the data analyzer 210. The second logic core 264 may receive compensated data from the first logic core 262 and may operate a second compensation operation. The latch 510 may receive second compensation data from the second logic core 264.

The integrated driver ID may further include a flag generator 230, a line buffer 220 and a selector 240. The flag generator 230 may generate a flag signal representing a state of the line data according to the analysis result of the data analyzer 210. The line buffer 220 may store the line data. The selector 240 may selectively output the line data stored in the line buffer to the logic core 260 based on the flag signal.

In the present embodiment, the data analyzer 210 may determine whether the line data represent a single pattern.

When the line data represent the single pattern, the data transmitter 250 may output the first pixel data PD1 among the line data to the first logic core 262.

For example, when the line data represent the single pattern, the flag generator 230 may generate the flag signal having a flag of one. When the line data do not represent the single pattern, the flag generator 230 may generate the flag signal having a flag of zero. The flag generator 230 may output the flag signal to the selector 240 and the latch 510.

When the flag is one, the selector 240 may not output the line data to the first logic core 262. In contrast, when the flag is zero, the selector 240 may output the line data to the first logic core 262.

When the flag is one, the first logic core 262 may compensate the first pixel data PD1 and may output compensated first pixel data CPD1 to the second logic core 264. When the flag is zero, the first logic core 262 may compensate all of the line data and may output the compensated line data to the second logic core 264.

The second logic core 264 may compensate input data regardless of the flag.

For example, functions included in the first logic core 262 may be compensations based on the grayscale value of the present pixel data. In contrast, functions included in the second logic core 264 may be compensations based on other compensation components in addition to the grayscale value of the present pixel data.

For example, the first logic core 262 may operate a luminance adjustment, a color compensation and a gamma compensation. For example, the second logic core 264 may operate a frame compensation which compensates the present frame data based on the previous frame data and the present frame data, a stain compensation operated based on stain values according to positions of the pixels in the display panel 100, a threshold voltage compensation of driving switching elements of the pixels and a deterioration compensation of light emitting elements of the pixels.

In the present embodiment, the data analyzer 210 may determine whether grayscale values of all subpixels of the line data are equal to or less than a threshold grayscale value. The operation of the integrated driver ID may be substantially same as explained above referring to FIG. 4 when the grayscale values of all subpixels of the line data are equal to or less than the threshold grayscale value. In this case, the operation of the first logic core 262 may be omitted but the operation of the second logic core 264 may not be omitted. Alternatively, when the grayscale values of all subpixels of the line data are equal to or less than the threshold grayscale value, both of the operations of the first logic core 262 and the second logic core 264 may be omitted.

Figure 9:
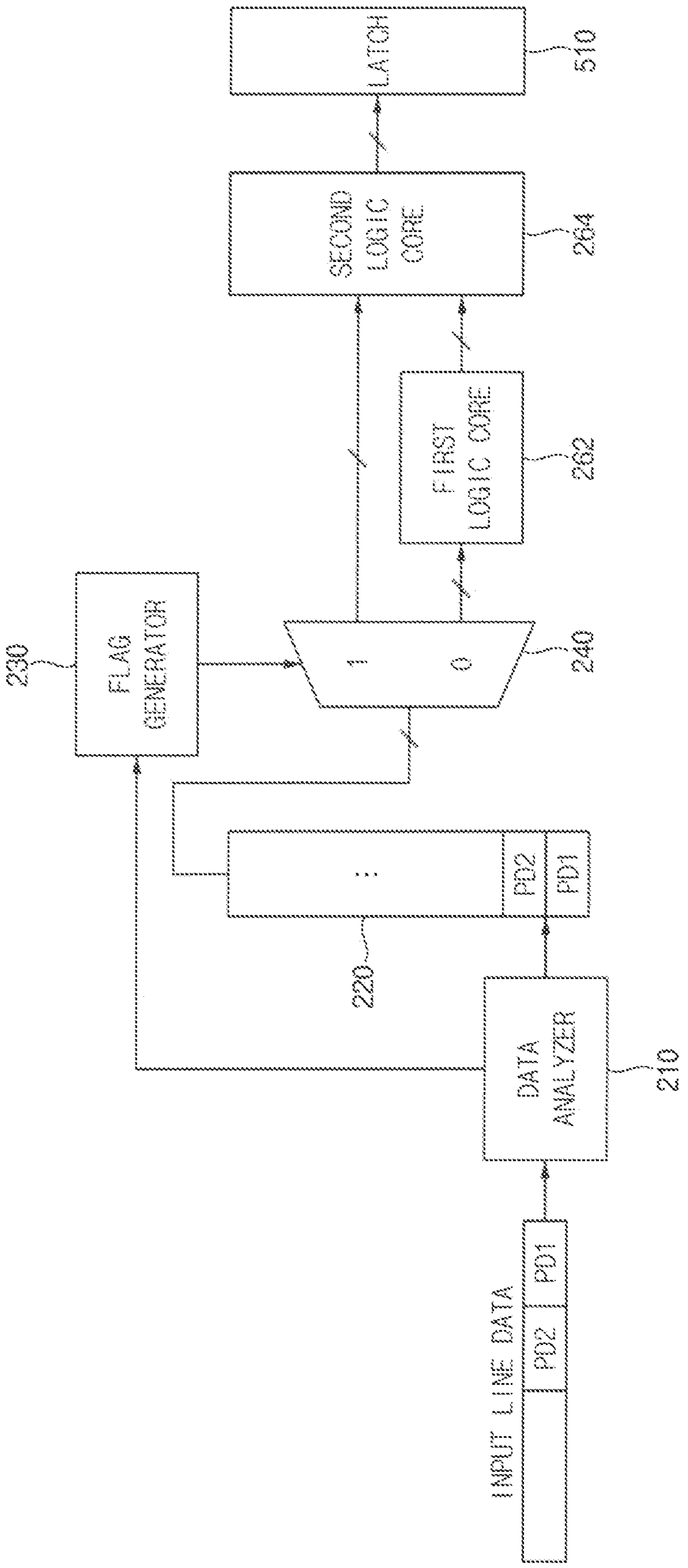
FIG. 9 is a block diagram illustrating an integrated driver of a display apparatus according to an embodiment of the present inventive concept.

FIG. 9 is a block diagram illustrating an integrated driver ID of a display apparatus according to an embodiment of the present inventive concept.

The display apparatus and the method of driving the display panel according to the present embodiment is substantially the same as the display apparatus and the method of driving the display panel of the previous embodiment explained referring to FIGS. 5 and 6 except for the structure and the operation of the integrated driver. Thus, the same reference numerals will be used to refer to the same or like parts as those described in the previous embodiment of FIGS. 5 and 6 and any repetitive explanation concerning the above elements will be omitted.

Referring to FIGS. 1, 6 and 9, the display apparatus includes a display panel 100 and a display panel driver. The display panel driver includes a driving controller 200, a gate driver 300, a gamma reference voltage generator 400 and a data driver 500.

The driving controller 200 and the data driver 500 may be integrated into one chip. Alternatively, the driving controller 200, the gamma reference voltage generator 400 and the data driver 500 may be integrated into one chip. A driving module including at least the driving controller 200 and the data driver 500 which are integrated into one chip may be called to the integrated driver ID.

The integrated driver ID may include a data analyzer 210, a first logic core 262, a second logic core 264 and a latch 510. The data analyzer 210 may analyze the input image data IMG which include input line data. The first logic core 262 may compensate all of line data, compensate a part of the line data, or not compensate all of the line data according to the analysis result of the data analyzer 210. The second logic core 264 may receive compensated data from the first logic core 262 and may operate a second compensation operation. The latch 510 may receive second compensation data from the second logic core 264.

The integrated driver ID may further include a flag generator 230, a line buffer 220 and a selector 240. The flag generator 230 may generate a flag signal representing a state of the line data according to the analysis result of the data analyzer 210. The line buffer 220 may store the line data. The selector 240 may selectively output the line data stored in the line buffer to the logic core 260 that includes a first logic core 262 and the second logic core 264 based on the flag signal.

In the present embodiment, the data analyzer 210 may determine whether the line data are substantially the same as previous line data stored in the line buffer 220.

When the line data are substantially the same as the previous line data, the line data may not be compensated and may not be refreshed to the latch 510, but the previous line data stored in the latch 510 may be re-outputted to the display panel 100.

For example, when the line data are substantially the same as the previous line data, the flag generator 230 may generate the flag signal having a flag of one. When the line data are different from the previous line data, the flag generator 230 may generate the flag signal having a flag of zero. The flag generator 230 may output the flag signal to the selector 240.

When the flag is one, the selector 240 may not output the line data to the first logic core 262. In contrast, when the flag is zero, the selector 240 may output the line data to the first logic core 262.

When the flag is one, the first logic core 262 may not operate. When the flag is zero, the first logic core 262 may compensate all of the line data and may output the compensated line data to the second logic core 264.

When the flag is one, the second logic core 264 may directly receive the line data from the selector 240.

The second logic core 264 may compensate input data regardless of the flag.

According to the present embodiment, the input image data IMG may be analyzed and the data processing of a portion of the input image data IMG or all of the input image data may be omitted so that the power consumption may be reduced.

For example, when the line data of the input image data IMG represent the single pattern, the grayscale values of all of the subpixels in the line data are equal to or less than the threshold grayscale value or the line data are same as the previous line data, some or all of the data processing of the first logic core 262 may be omitted so that the power consumption due to the data operation logics may be reduced.

According to the display apparatus and the method of driving the display panel in the present inventive concept, the power consumption of the display apparatus may be reduced and the display quality of the display panel may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:

a display panel configured to display an image;

a data analyzer configured to analyze input image data which include a line data;

a logic core configured to compensate the line data according to an analysis result of the data analyzer;

a flag generator configured to receive the line data from the data analyzer and generate a flag signal having a flag of one when the line data represent a single pattern and configured to generate the flag signal having a flag of zero when the line data do not represent the single pattern; and a latch configured to receive compensated data from the logic core, wherein the data analyzer is configured to determine whether the line data represents the single pattern in which all pixel data included in the line data have a same grayscale value, wherein the logic core is configured to compensate only one pixel data among the all pixel data included in the line data when the line data represent the single pattern, wherein, when the flag is one, the logic core is configured to compensate only the first pixel data and to output a compensated first pixel data to the latch, and wherein, when the flag is zero, the logic core is configured to compensate all of the line data and to output compensated line data to the latch.

2. The display apparatus of claim 1, further comprising a data transmitter configured to output only a first pixel data among the all pixel data to the logic core when the line data represent the single pattern.

3. A display apparatus comprising:

a display panel configured to display an image;

a data analyzer configured to analyze input image data which include a line data;

a logic core configured to compensate the line data according to an analysis result of the data analyzer;

a flag generator configured to receive the line data from the data analyzer and generate a flag signal having a flag of one when the line data represent a single pattern and configured to generate the flag signal having a flag of zero when the line data do not represent the single pattern; and a latch configured to receive compensated data from the logic core, wherein the data analyzer is configured to determine whether the line data represents the single pattern in which all pixel data included in the line data have a same grayscale value, wherein the logic core is configured to compensate only one pixel data among the all pixel data included in the line data when the line data represent the single pattern, wherein, when the flag is one, the logic core is configured to compensate the first pixel data and to output a compensated first pixel data to a second logic core, wherein, when the flag is zero, the logic core is configured to compensate all of the line data and to output compensated line data to the second logic core, and wherein the second logic core is configured to compensate input data regardless of the flag.

4. A display apparatus comprising:

a display panel configured to display an image;

a data analyzer configured to analyze input image data which include a line data, the data analyzer being configured to determine whether grayscale values of all subpixels of the line data are equal to or less than a threshold grayscale value;

a logic core configured to compensate the line data according to an analysis result of the data analyzer;

a data transmitter configured to output only one pixel data among the line data to the logic core when the grayscale values of the all subpixels of the line data are equal to or less than the threshold grayscale value; and a latch configured to receive compensated data from the logic core.

5. The display apparatus of claim 4, wherein the data transmitter is configured to output only a first pixel data among the line data to the logic core when the grayscale values of the all subpixels of the line data are equal to or less than the threshold grayscale value.

6. The display apparatus of claim 4, wherein, when the grayscale values of the all subpixels of the line data are equal to or less than the threshold grayscale value, the latch is configured to output predetermined fixed data.

7. A display apparatus comprising:

a display panel configured to display an image;

a data analyzer configured to analyze input image data which include a line data, the data analyzer being configured to determine whether the line data are substantially the same as a previous line data stored in a line buffer;

a logic core configured to compensate the line data according to an analysis result of the data analyzer; and a latch configured to receive compensated data from the logic core;

a flag generator configured to generate a flag signal having a flag of one when the line data are substantially the same as the previous line data and configured to generate the flag signal having a flag of zero when the line data are different from the previous line data, wherein the latch output the previous line data stored in the line buffer when the line data is substantially the same as the previous line data, wherein, when the flag is one, the logic core is configured not to operate, wherein, when the flag is zero, the logic core is configured to compensate all pixel data in the line data and to output compensated line data to a second logic core, and wherein the second logic core is configured to compensate input data regardless of the flag and to output compensated input data to the latch.

8. The display apparatus of claim 7, wherein, when the flag is one, the second logic core is configured to directly receive the line data from a selector.

9. The display apparatus of claim 1, further comprising:

a line buffer configured to store the line data; and a selector configured to selectively output the line data stored in the line buffer to the logic core based on the flag signal.

10. The display apparatus of claim 9, further comprising a data transmitter configured to output first pixel data among the line data to the logic core according to the analysis result of the data analyzer.

11. A method of driving a display panel, the method comprising:

analyzing input image data which includes a line data;

determining whether the line data represent a single pattern in which all pixel data included in the line data have a same grayscale value;

generating a flag signal having a flag of one when the line data represent the single pattern and generating the flag signal having a flag of zero when the line data do not represent the single pattern;

compensating only a first pixel data among the line data when the line data represent the single pattern; and outputting the compensated first pixel data to all of the pixels in a line of the display panel when the line data represent the single pattern, wherein, when the flag is one, compensating only the first pixel data and outputting a compensated first pixel data to a latch, and wherein, when the flag is zero, compensating all of the line data and outputting compensated line data to the latch.

12. The method of claim 11, further comprising:

compensating respective pixel data of the line data when the line data do not represent the single pattern; and outputting respective compensated pixel data to respective pixels in the line of the display panel when the line data do not represent the single pattern.

13. A method of driving a display panel, the method comprising:

analyzing input image data which includes a line data;

determining whether grayscale values of all subpixels of the line data are equal to or less than a threshold grayscale value;

compensating only a first pixel data among the line data when the grayscale values of all subpixels of the line data are equal to or less than the threshold grayscale value; and outputting the compensated first pixel data to all of the pixels in a line of the display panel when the grayscale values of all subpixels of the line data are equal to or less than the threshold grayscale value.

14. A method of driving a display panel, the method comprising:

analyzing input image data which includes a line data;

determining whether the line data are substantially the same as previous line data stored in a line buffer;

outputting previous line data stored in a latch to pixels in a line of the display panel when the line data are substantially the same as the previous line data stored in the line buffer;

generating a flag signal having a flag of one when the line data are substantially the same as the previous line data; and generating the flag signal having a flag of zero when the line data are different from the previous line data, wherein, when the flag is one, a logic core is configured not to operate, wherein, when the flag is zero, the logic core is configured to compensate all pixel data in the line data and to output compensated line data to a second logic core, and wherein the second logic core is configured to compensate input data regardless of the flag and to output compensated input data to the latch.

15. The method of claim 13, further comprising:

compensating respective pixel data of the line data when a grayscale value of at least one subpixel of the line data is greater than the threshold grayscale value; and outputting respective compensated pixel data to respective pixels in the line of the display panel when the grayscale value of the at least one subpixel of the line data is greater than the threshold grayscale value.

16. The method of claim 14, further comprising:

compensating respective pixel data of the line data when the line data are different from the previous line data stored in the line buffer; and outputting respective compensated pixel data to respective pixels in the line of the display panel when the line data are different from the previous line data stored in the line buffer.

* * * * *